US012448833B2

(12) United States Patent
Anderson

(10) Patent No.: US 12,448,833 B2
(45) Date of Patent: Oct. 21, 2025

(54) FENESTRATION UNIT WITH SILL ARRANGEMENT FLUID MANAGEMENT SYSTEM

(71) Applicant: JELD-WEN, Inc., Charlotte, NC (US)

(72) Inventor: Jacob David Anderson, Remond, OR (US)

(73) Assignee: JELD-WEN, Inc.

( * ) Notice: Subject to any disclaimer, the term of this patent is extended or adjusted under 35 U.S.C. 154(b) by 267 days.

(21) Appl. No.: 18/456,850

(22) Filed: Aug. 28, 2023

(65) Prior Publication Data

US 2025/0075556 A1 Mar. 6, 2025

(51) Int. Cl.

| | |
|---|---|
| ***E06B 7/14*** | (2006.01) |
| ***E06B 1/68*** | (2006.01) |
| ***E06B 1/70*** | (2006.01) |
| ***E06B 3/46*** | (2006.01) |
| ***E06B 3/96*** | (2006.01) |
| ***E06B 3/964*** | (2006.01) |

(52) U.S. Cl.

CPC .................. *E06B 7/14* (2013.01); *E06B 1/68* (2013.01); *E06B 1/70* (2013.01); *E06B 3/4609* (2013.01); *E06B 3/9632* (2013.01); *E06B 3/964* (2013.01); *E06B 3/9641* (2013.01); *E06B 3/9642* (2013.01)

(58) Field of Classification Search

CPC . E06B 1/68; E06B 1/70; E06B 3/4609; E06B 3/9632; E06B 3/964; E06B 3/9641; E06B 3/9642; E06B 7/14

See application file for complete search history.

(56) References Cited

U.S. PATENT DOCUMENTS

| | | | | |
|---|---|---|---|---|
| 5,038,537 | A * | 8/1991 | Frambach | E06B 3/325 52/204.593 |
| 7,536,833 | B2 * | 5/2009 | Baczuk | E06B 1/70 49/467 |
| 8,375,659 | B2 * | 2/2013 | Bogenhagen | E06B 1/70 49/470 |
| 10,844,654 | B1 * | 11/2020 | Smith | E06B 3/9632 |
| 10,844,655 | B2 * | 11/2020 | Kindt | E06B 7/14 |
| 11,319,747 | B2 * | 5/2022 | Kindt | E06B 1/70 |
| 11,859,441 | B2 * | 1/2024 | Meyer | E06B 3/9632 |

(Continued)

FOREIGN PATENT DOCUMENTS

| | | |
|---|---|---|
| CN | 205259828 U | 5/2016 |
| DE | 102005044944 A1 | 3/2006 |

(Continued)

*Primary Examiner* — Jessie T Fonseca

(74) *Attorney, Agent, or Firm* — Ingrassia Fisher & Lorenz, LLP

(57) ABSTRACT

A sill arrangement for a fenestration frame includes a sill with a first chamber, a second chamber, a third chamber, and a fourth chamber. The sill includes a first internal wall that separates the first chamber from the second chamber. The sill arrangement also includes a corner key with a first port defining a first passage between the first and second chambers and a second passage between the second and third chambers of the sill. Moreover, a second port is included on the sill-facing surface that defines a third passage between the third and fourth chambers for allowing fluid to flow from the third chamber to the fourth chamber. The corner key further includes a drain in communication with the fourth chamber.

20 Claims, 6 Drawing Sheets

(56) References Cited

U.S. PATENT DOCUMENTS

2005/0115178 A1* 6/2005 Schmidt ................ E06B 3/9641 52/272
2006/0096190 A1* 5/2006 Baczuk ..................... E06B 1/70 52/204.1
2007/0056701 A1* 3/2007 Brooker .................... E06B 9/52 160/381
2009/0165406 A1* 7/2009 Campbell ................. E06B 7/14 52/211
2010/0162644 A1* 7/2010 Campbell ................. E06B 7/14 52/656.2
2010/0325982 A1* 12/2010 Bogenhagen ............. E06B 1/70 52/211
2017/0234060 A1* 8/2017 Graetsch ................... E06B 7/26 49/471
2020/0190896 A1* 6/2020 Kindt ......................... E06B 1/70
2023/0134444 A1* 5/2023 Meyer ................... E06B 3/9641 52/209

FOREIGN PATENT DOCUMENTS

EP 2246513 B1 1/2016
GB 2378975 A 2/2003
JP 2002250066 A 9/2002
WO 2006076496 A2 7/2006
WO 2009086510 A1 7/2009
WO 2010077236 A1 7/2010

* cited by examiner

FENESTRATION UNIT WITH SILL ARRANGEMENT FLUID MANAGEMENT SYSTEM

TECHNICAL FIELD

The field of this disclosure relates generally to fenestration units and, more particularly, to a fenestration unit with a sill arrangement fluid management system for limiting water intrusion into a building or dwelling interior.

BACKGROUND

Fenestration units, may provide a degree of protection against water intrusion into the building. The unit may include certain features that help serve as a weather-proofing barrier for the fenestration unit. These features may block and/or divert water away from the fenestration unit and from the interior of the building to avoid mildew, rot, or other water damage.

However, these systems may disadvantageously add complexity and/or cost to the fenestration unit. There may be manufacturing inefficiency, increased assembly time, and/or other disadvantages. These problems may be particular to fenestration units with moveable panels (e.g., a sliding door unit with a horizontally-sliding door panel or a window unit with a horizontally-sliding sash).

Accordingly, there is a need for a sill arrangement for a fenestration unit that incorporates an improved water management system for providing drainage and/or diversion of water away from the sill arrangement and the fenestration unit. There is also a need for such a sill arrangement having a streamlined and simple design that reduces manufacturing costs and assembly time and that simplifies installation. Additionally, there is a need for a sill arrangement that is strong and robust for supporting the panel(s) and other components of the fenestration unit. Additional aspects and advantages will be apparent from the following detailed description of example embodiments, which proceeds with reference to the accompanying drawings.

SUMMARY

A sill arrangement for a fenestration frame configured for supporting a panel is disclosed. The sill arrangement includes a sill that is elongate and that includes a first longitudinal end and a second longitudinal end. The sill includes a first chamber, a second chamber, a third chamber, and a fourth chamber. The sill includes a first internal wall that separates the first chamber from the second chamber. The sill arrangement also includes a corner key having a sill-facing surface, and the corner key is coupled to the first longitudinal end of the sill along the sill-facing surface. The corner key includes a first port included on the sill-facing surface. The first port defines a first fluid passage between the first and second chambers of the sill. The first port defines a second fluid passage between the second and third chambers of the sill. Moreover, a second port is included on the sill-facing surface and offset from the first port. The second port defines a third fluid passage between the third and fourth chambers. The corner key further includes a drain in fluid communication with the fourth chamber and configured to direct fluid from the fourth chamber and out of the corner key.

Additionally, a fenestration unit is disclosed, which includes a first panel, a second panel, and a frame that supports the first panel and the second panel. The frame includes a sill arrangement having a sill that is elongate and that includes a first longitudinal end and a second longitudinal end. The sill includes a first chamber, a second chamber, a third chamber, and a fourth chamber. The sill includes a first internal wall that separates the first chamber from the second chamber. The sill includes a slider rail configured to support the first panel for sliding movement on the slider rail within the frame. The slider rail is aligned with the first internal wall. The sill arrangement further includes a corner key having a sill-facing surface. The corner key is coupled to the first longitudinal end of the sill along the sill-facing surface. The corner key includes a first port included on the sill-facing surface. The first port defines a first fluid passage between the first and second chambers of the sill. The first port defines a second fluid passage between the second and third chambers of the sill. The corner key also includes a second port included on the sill-facing surface and offset from the first port. The second port defines a third fluid passage between the third and fourth chambers. Additionally, the corner key includes a drain in fluid communication with the fourth chamber and configured to direct fluid from the fourth chamber and out of the corner key.

Furthermore, a method of assembling a sill arrangement for a fenestration frame configured for supporting a panel is disclosed. The method includes providing a sill that is elongate and that includes a first longitudinal end and a second longitudinal end. The sill includes a first chamber, a second chamber, a third chamber, and a fourth chamber. The sill includes a first internal wall that separates the first chamber from the second chamber. Additionally, the method includes attaching sill-facing surface of a corner key to the first longitudinal end of the sill. The corner key includes a first port included on the sill-facing surface, the first port defining a first fluid passage between the first and second chambers of the sill, the first port defining a second fluid passage between the second and third chambers of the sill. The corner key also includes a second port included on the sill-facing surface and offset from the first port. The second port defines a third fluid passage between the third and fourth chambers. The corner key also includes a drain in communication with the fourth chamber and configured to direct fluid from the fourth chamber and out of the corner key.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
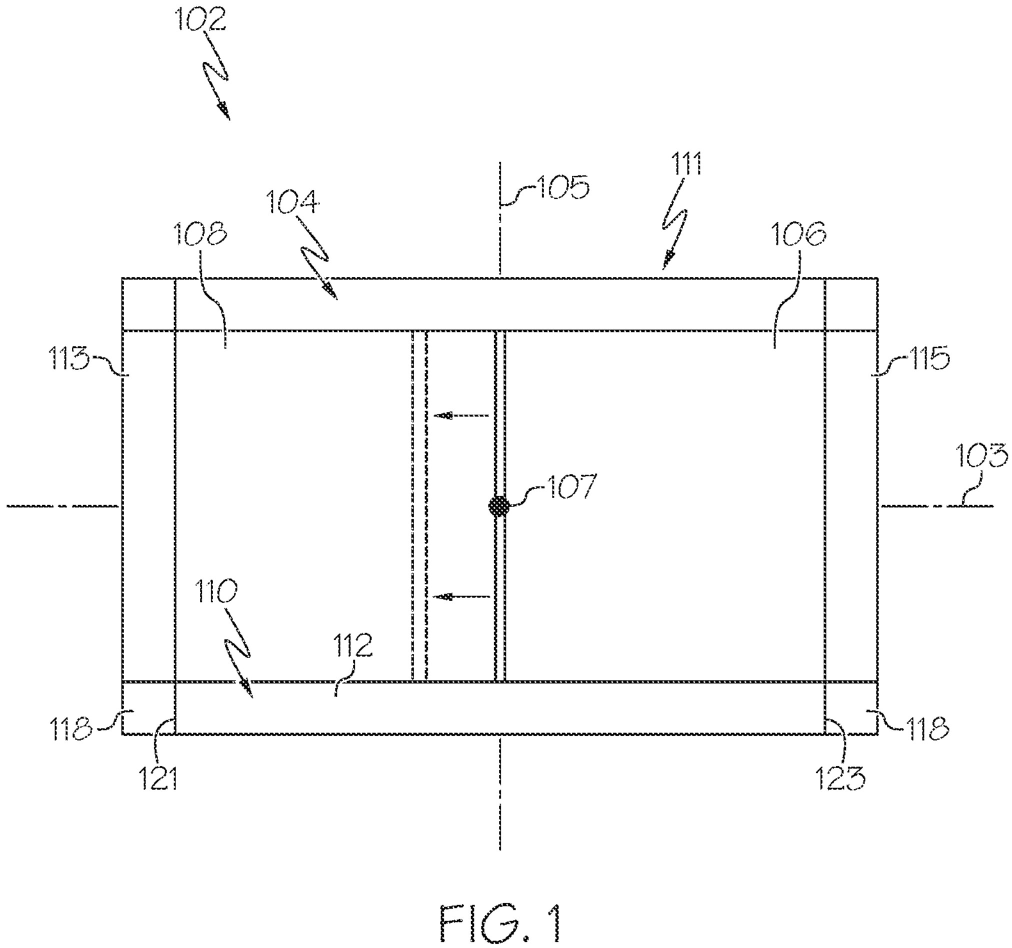
FIG. 1 is a front view of a fenestration unit for a dwelling configured according to example embodiments of the present disclosure, wherein the fenestration unit includes a sill arrangement with a water management system.

With reference to the drawings, this section describes embodiments of a sill arrangement for a fenestration unit and its detailed construction and operation. Throughout the specification, reference to "one embodiment," "an embodiment," or "some embodiments" means that a particular described feature, structure, or characteristic may be included in at least one embodiment of the sill arrangement. Thus, appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

Generally, embodiments of the present disclosure include a sill arrangement for a fenestration unit that is configured with features of a water management system. In some embodiments, the sill arrangement may be configured for supporting a sliding panel, such as a horizontally-sliding door or window.

During extreme weather events, the exterior of the fenestration unit may be subjected to elevated air pressure and/or intensive precipitation. As these conditions continue for prolonged periods of time, a substantial pressure differential may be created between the exterior environment (high pressure region) and interior environment (low pressure region). This pressure differential may result in water being forced through the sill arrangement, such as through small openings or seams at various adjoining surfaces, and toward the interior of the building or dwelling. Thus, the sill arrangement includes a fluid management system (also referred to as "water management system") that handles, directs, channels, pushes, or otherwise moves water or other liquids that have entered the sill arrangement and allow it to drain away and back to the exterior environment. The sill arrangement may also manage percolation, bubble, and/or other airflow therethrough for additional performance advantages.

These embodiments may be used for any suitable fenestration system. In some embodiments, the fenestration system of the present disclosure may be a patio door system for a building, dwelling, or other structure. The sill arrangement may include a sill and a pair of corner keys at each end. In a completed fenestration frame assembly, each corner key may couple to and support an upright jamb member. In some embodiments, the sill arrangement and the other components of the frame may support a moveable or active panel, such as a sliding door panel. In other embodiments, the sill arrangement may support another door panel or window sash configuration. The water management system may include features that bolster support of an active panel (i.e., a panel moveably supported within the frame) while also allowing fluid flow through the sill arrangement.

During use, water may move through channels, openings, ports, apertures, etc. that are defined by the sill, the corner key(s), and/or other components of the sill arrangement for diverting water away from the sill arrangement and from an interior of the dwelling. Thus, the water management system may limit, impede, or otherwise reduce water intrusion into the structure. The sill assembly may also direct air, bubbles, etc. for improved performance. Furthermore, the sill assembly may avoid negative effects caused by pressure differences between the interior and exterior of the dwelling.

FIG. 1 illustrates a fenestration unit 102 according to example embodiments of the present disclosure. The fenestration unit 102 may be configured as a door unit in some embodiments. In some embodiments, the fenestration unit 102 may be configured as horizontally-sliding patio door unit for a building, dwelling, or other structure. However, it will be appreciated that features of the present disclosure may be included in another fenestration unit without departing from the scope of the present disclosure.

The fenestration unit 102 may include a rectangular frame 104 that defines a first axis 103, a second axis 105, and a third axis 107, which are orthogonal to each other. The second axis 105 may be a vertical axis that is generally aligned with the direction of gravity, the first axis 103 may be a horizontal axis extending across the frame 104, and the third axis 107 may be a horizontal axis extending in an interior-exterior direction through the frame 104.

The fenestration unit 102 may also include a first panel 106, and a second panel 108. The first and second panels 106, 108 may be supported within the frame 104. In some embodiments, the second panel 108 may be fixed within the frame 104, and the first panel 106 may be supported for movement within the frame 104 between a closed position and an open position. The first panel 106 may be supported for sliding movement along the first axis 103 as the first panel 106 moves within the frame between the closed and open positions. The first panel 106 is shown in a closed position in solid lines in FIG. 1, and the first panel 106 is shown in broken lines moving toward the open position in FIG. 1.

The frame 104 may include a sill arrangement 110 and a header 111 that are spaced apart along the second axis 105. The frame 104 may also include a first jamb 113 and a second jamb 115 that are attached to the sill arrangement 110 and the header 111 and that are spaced apart along the first axis 103.

In some embodiments, the sill arrangement 110 may generally include at least one elongate sill 112 (i.e., sill member) and at least one corner key 118. In some embodiments, there may be a single elongate sill 112 with opposing corner keys 118 at each longitudinal end. One corner key 118 may attach to a first longitudinal end 121 of the sill 112 and may also attach to the first jamb 113. The other corner key 118 may attach to the other, second longitudinal end 123 of the sill 112 and may also attach to the second jamb 115. Stated differently, at least one end 121 of the sill 112 is attached to a corner key 118 as described below.

The sill 112 may be a straight, lineal, elongate, thin-walled, and hollow member. The sill 112 may be a single, unitary, one-piece part. In additional embodiments, the sill 112 may include multiple parts that are assembled together, for example, to form the profile shape shown in FIG. 6. In some embodiments, the sill 112 may be constructed via an extrusion process. The sill 112 may be made from any suitable materials, such as polyvinyl chloride (PVC), pultruded fiberglass, aluminum or any other suitable materials.

Figure 2:
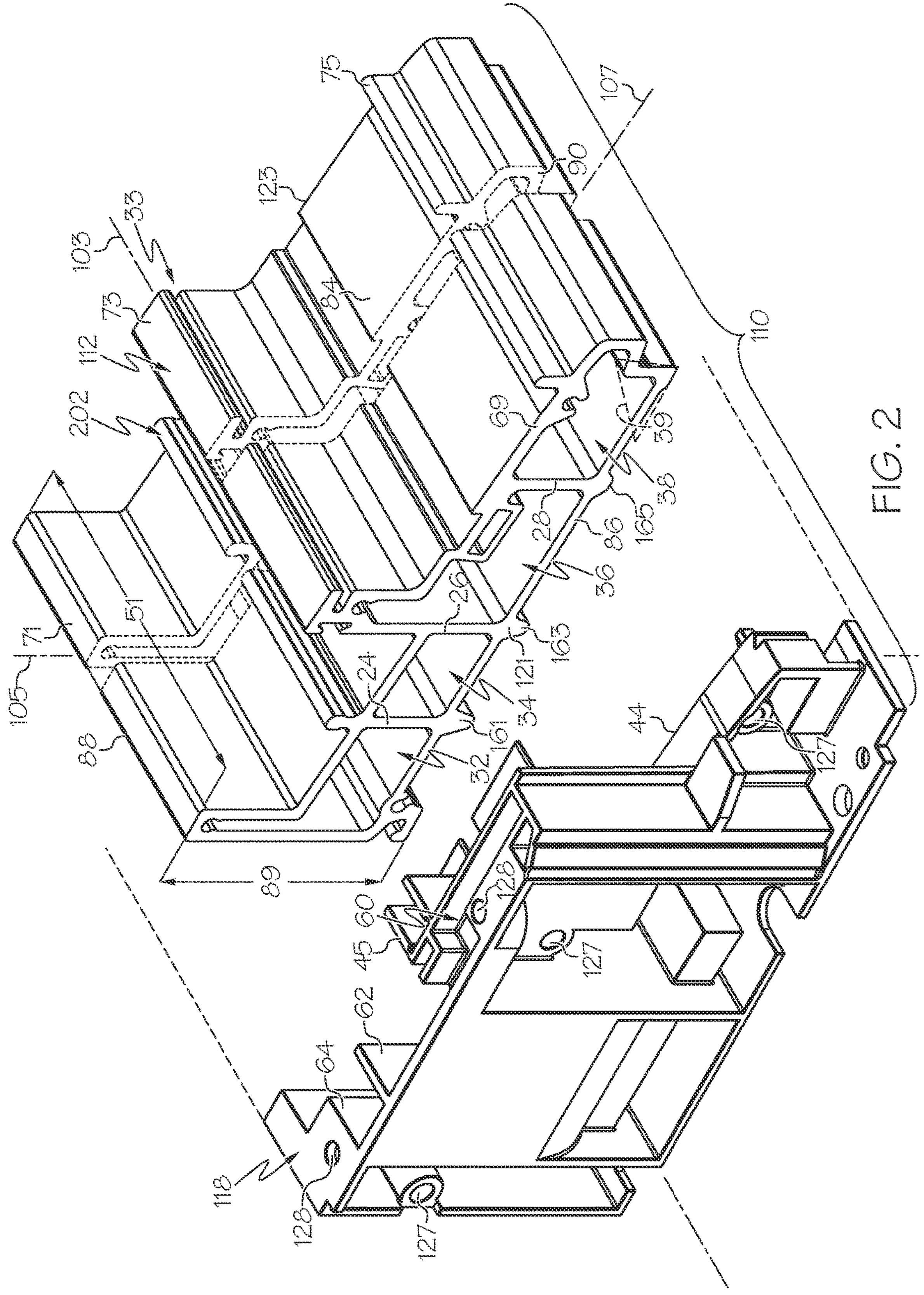
FIG. 2 is an exploded isometric view of the sill arrangement of the fenestration unit of FIG. 1 taken from a first perspective according to example embodiments of the present disclosure.
Figure 3:
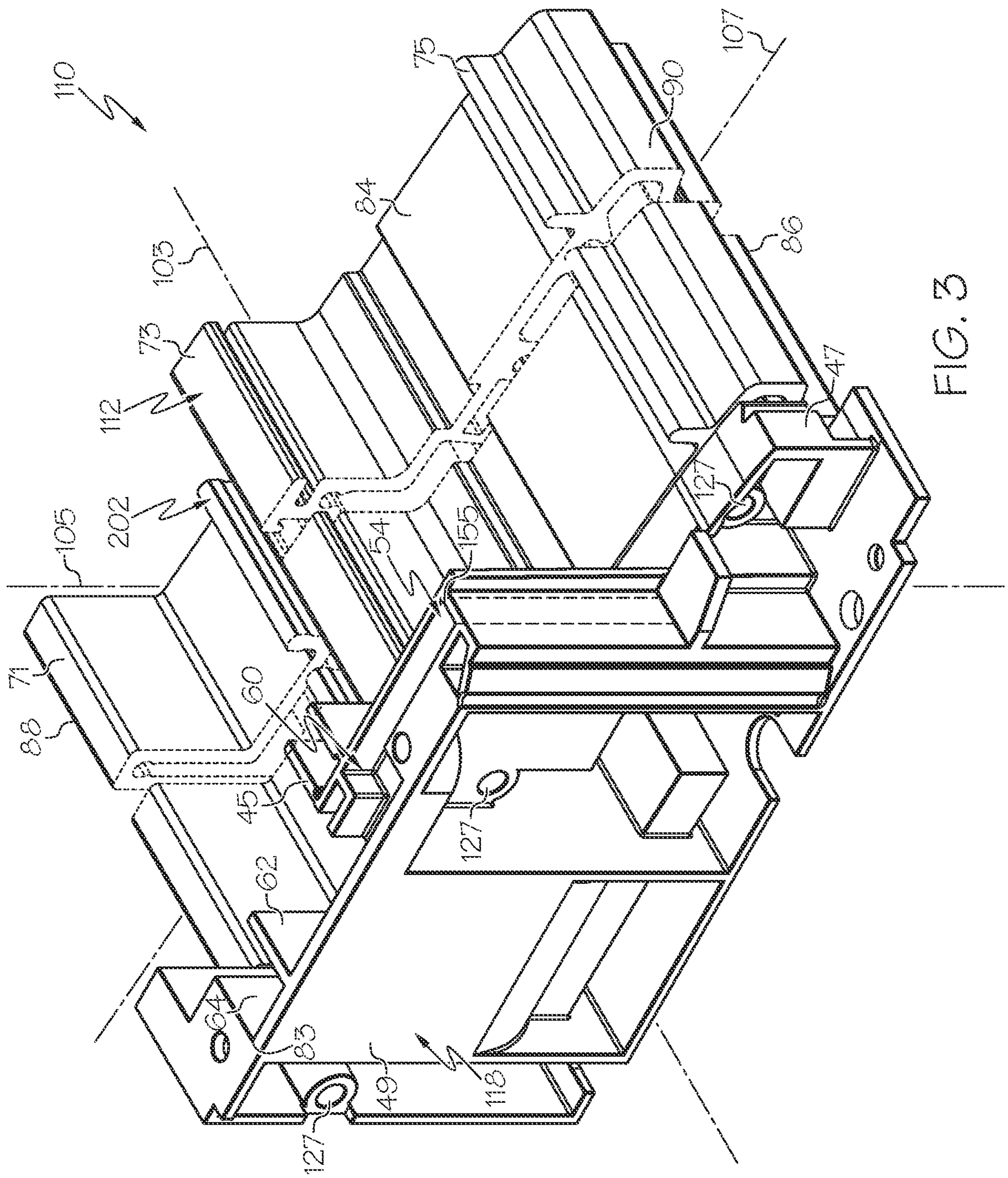
FIG. 3 is an isometric view of the sill arrangement of FIG. 2 shown in an assembled state.
Figure 4:
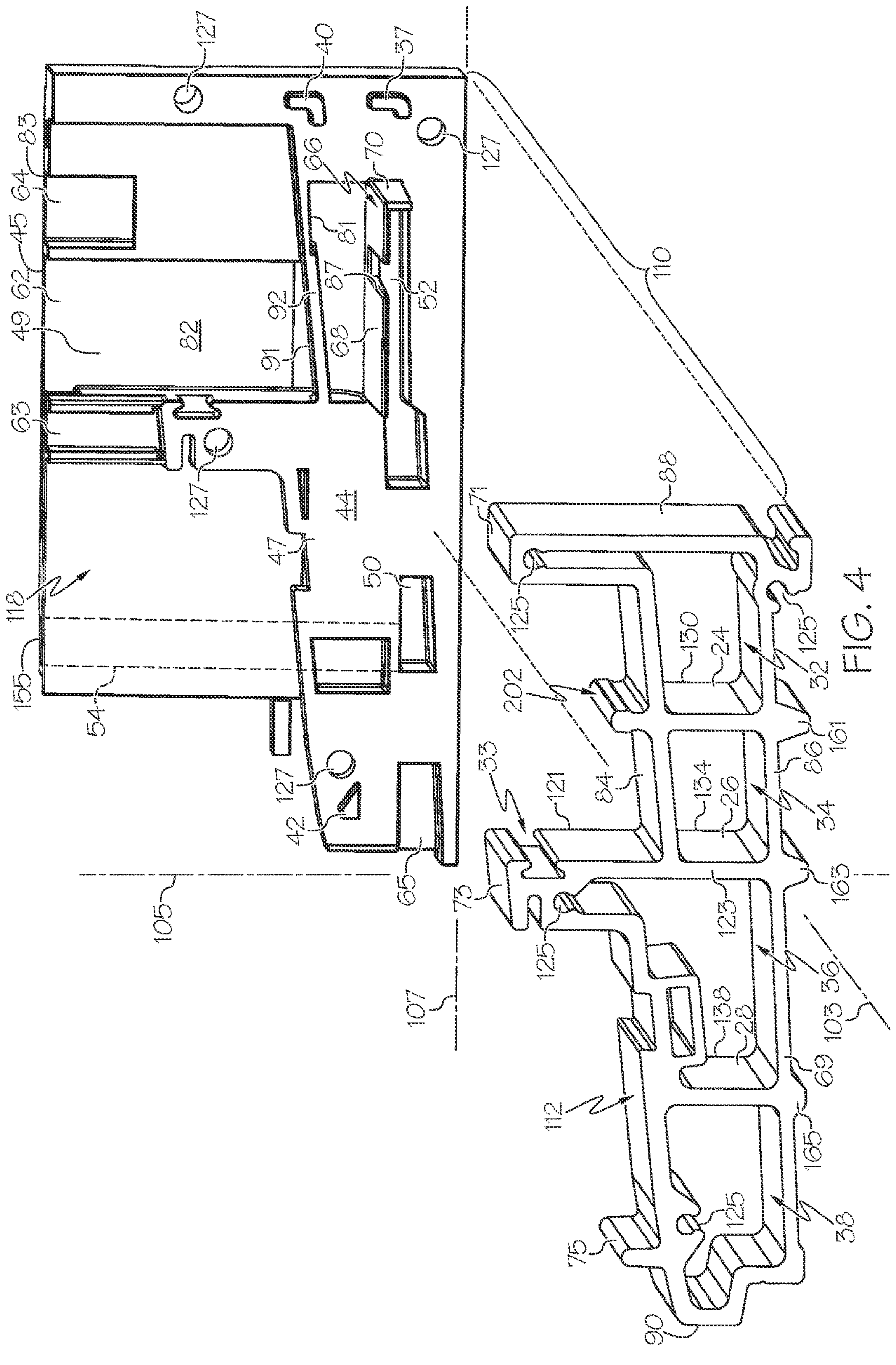
FIG. 4 is an exploded isometric view of the sill arrangement of FIG. 2 taken from a second perspective.

The sill 112 is shown in further detail in FIGS. 2-6 according to some embodiments. The first longitudinal end 121 and the second longitudinal end 123 are shown in FIGS. 2 and 4. The first and second longitudinal ends 121, 123 are separated along the first axis 103 to define a length 51 (FIG. 2) of the sill 112. In FIG. 2, a segment of the sill 112 is hidden as indicated with broken lines, and it will be appreciated that the sill 112 may be of any suitable longitudinal length 51 as measured between the first and second longitudinal ends 121, 123 along the axis 103. In some embodiments, the sill 112 may be continuous and uninterrupted between the two corner keys 118 represented in FIG. 1.

As shown in FIGS. 2 and 4, the sill 112 may have an outer wall 69 that defines an outer periphery of the sill 112 and that defines a hollow interior of the sill 112. The outer wall 69 may define a top side 84 and a bottom side 86 of the sill 112, and the outer wall 69 may define an interior side 88 of the sill arrangement 110 and an exterior side 90 of the sill arrangement 110. The top side 84 may face upward along the second axis 105 (toward the first panel 106 and the second panel 108 of FIG. 1). The bottom side 86 may face downward along the second axis 105, away from the first panel 106 and the second panel 108. The outer wall 69 at the interior side 88 may face inward (i.e., into the structure or dwelling) along the third axis 107, and outer wall 69 at the exterior side 90 may face outward (i.e., away from the structure or dwelling) along the third axis 107.

The outer wall 69 may also define the first end 121 of the sill 112. At the first end 121, the sill 112 may be planar. In other words, the first end 121 may lie within a common plane 39 (FIG. 2) that is normal to the first axis 103.

The sill 112 may have a height dimension 89 (FIG. 2), which is measured along the second axis 105. The height dimension 89 of the sill 112 may vary from the interior side 88 to the exterior side 90. The top side 84 may include an interior lip 71, a middle lip 73, and an exterior lip 75, each of which project upward along the axis 105 away from surrounding areas of the top side 84. The interior lip 71, middle lip 73, and exterior lip 75 may extend longitudinally along the first axis 103. The interior lip 71, middle lip 73, and exterior lip 75 may be spaced apart along the third axis 107 with the middle lip 73 disposed between the interior lip 71 and the exterior lip 75. The first panel 106 may be supported in the frame 104 between the interior lip 71 and the middle lip 73. The second panel 108 may be supported in the frame 104 between the middle lip 73 and the exterior lip 75. Thus, the first panel 106 may slide within the frame 104 and may at least partially overlap the second panel 108. Moreover, the middle lip 73 may define a seal housing 33 with recesses for weather stripping, seal members, and the like.

The sill 112 may also include a slider rail 202 that projects upward from the top side 84. The slider rail 202 may be disposed between the middle lip 73 and the interior lip 71 and offset from each along the third axis 107. The slider rail 202 may extend longitudinally along the first axis 103. The first panel 106 may slide along the slider rail 202 as it slides between its open and closed positions along the first axis 103. As shown in phantom in FIG. 5, the first panel 106 (i.e., the sliding panel) may include a panel support member 119 included along its bottom edge. The panel support member 119 schematically illustrated in FIG. 5 may be a roller that is rotatably attached to the panel 106. The panel support member 119 may be an open channel that extends along the axis 103. It will be appreciated that the panel support member 119 may be of other configurations as well. The panel support member 119 may receive the slider rail 202 of the sill 112 for supporting and guiding movement of the first panel 106 along the axis 103 between the open and closed positions. The slider rail 202 may support the first panel 106 with a significant portion of the weight of the first panel 106 borne by the slider rail 202. Also, the interior lip 71 and middle lip 73 may respectively oppose the interior and exterior faces of the first panel 106 to provide additional support.

Figure 5:
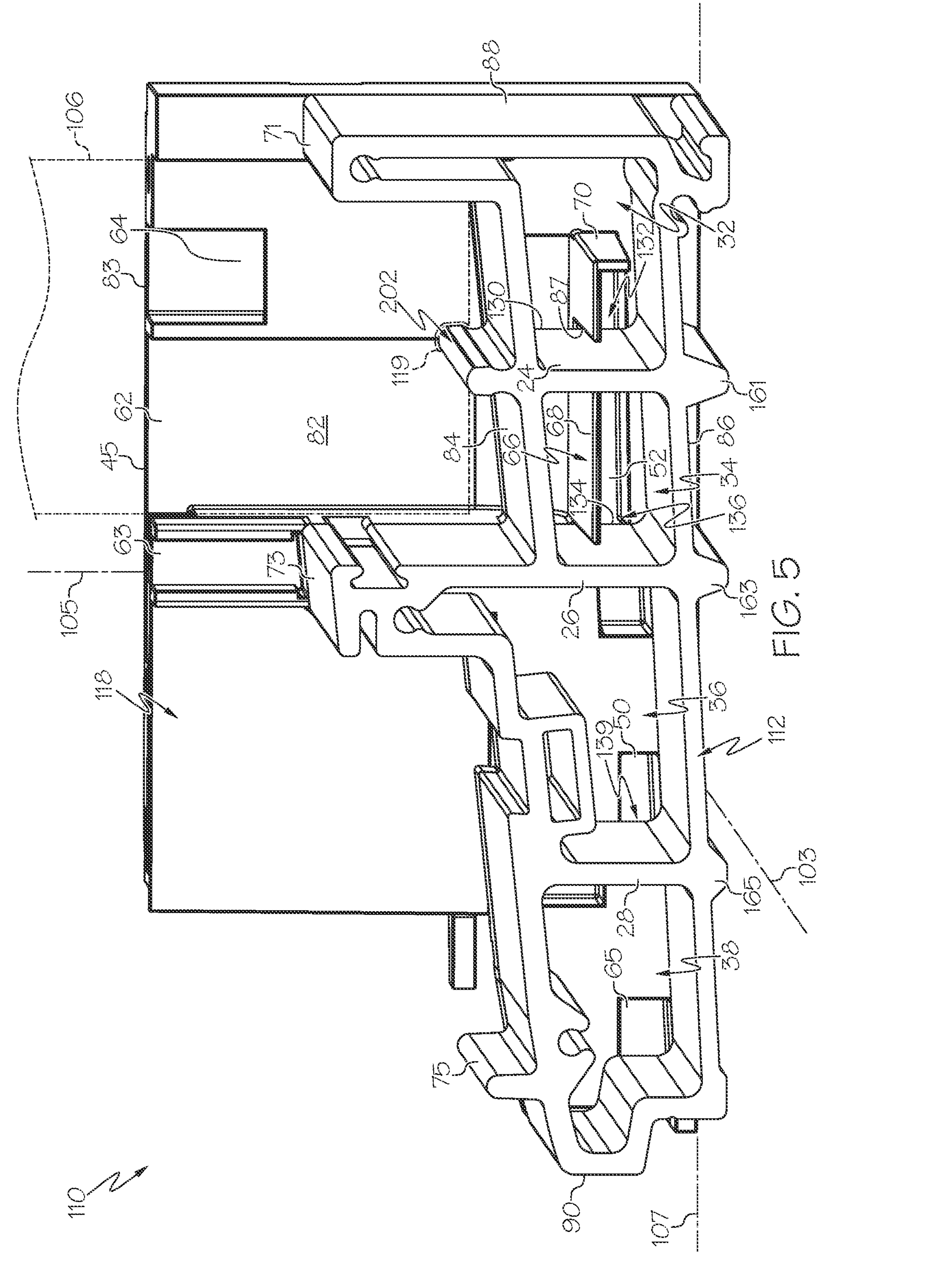
FIG. 5 is an isometric view of the sill arrangement of FIG. 4 shown in an assembled state.

As shown in FIGS. 4 and 5, the sill 112 may also include a plurality of internal walls 24, 26, 28 that extend vertically along the second axis 105 between the outer wall 69 at the top side 84 and at the bottom side 86. The sill 112 may include a first internal wall 24, a second internal wall 26, and a third internal wall 28. The first, second, and third internal walls 24, 26, 28 may extend continuously along the first axis 103 and may terminate at the first and second longitudinal ends 121, 123. The first, second, and third internal walls 24, 26, 28 may brace and support the outer wall 69 of the sill 112 at the top side 84 and bottom side 86.

The outer wall 69 and the internal walls 24, 26, 28 are arranged to define four distinct and hollow chambers 32, 34, 36, 38 of the sill 112. The chambers 32, 34, 36, 38 may each extend along the length of the sill 112 between the first and second longitudinal ends 121, 123. Specifically, the sill 112 may include a first chamber 32, a second chamber 34, a third chamber 36, and a fourth chamber 38.

The first chamber 32 may be disposed proximate the interior side 88. The first chamber 32 may be defined by the outer wall 69 at the interior side 88 and the first internal wall 24, and the first chamber 32 may be defined by the outer wall 69 at the top side 84 and bottom side 86 of the sill 112.

The second chamber 34 may be disposed closer to the interior side 88 than the exterior side 90 as measured along the third axis 107, but the first chamber 32 may be disposed closer to the interior side 88 than the second chamber 34. The second chamber 34 may be disposed between the third chamber 36 and the first chamber 32 along the third axis 107. The second chamber 34 may be defined by the first internal wall 24 and the second internal wall 26 along the third axis 107. Thus, the first internal wall 24 may separate the first chamber 32 from the second chamber 34, and the second internal wall 26 may separate the second chamber 34 from the third chamber 36. The second chamber 34 may also be defined by the outer wall 69 at the top side 84 and bottom side 86 of the sill 112 along the second axis 105.

The third chamber 36 may be disposed closer to the exterior side 90 than the interior side 88 as measured along the third axis 107, but the fourth chamber 38 may be disposed closer to the exterior side 90 than the third chamber 36. The third chamber 36 may be disposed between the second chamber 34 and the fourth chamber 38 along the third axis 107. The third chamber 36 may be defined by the second internal wall 26 and the third internal wall 28 along the third axis 107. The third chamber 36 may also be defined by the outer wall 69 at the top side 84 and bottom side 86 of the sill 112 along the second axis 105. Additionally, the third chamber 36 may have an L-shaped cross section with a portion of the third chamber 36 extending into the middle lip 73.

Moreover, the fourth chamber 38 may be disposed proximate the exterior side 90. The fourth chamber may be defined (along the third axis 107) by the third internal wall 28 and the outer wall 69 at the exterior side 90. Furthermore, the fourth chamber 38 may be defined along the second axis 105 by the outer wall 69 at the top side 84 and bottom side 86 of the sill.

The bottom side 86 of the sill 112 may include a plurality of support rails projecting therefrom. For example, the outer wall 69 may include a first support rail 161, a second support rail 163, and a third support rail 165, which project therefrom in a downward direction from the bottom side 86. The first, second, and third rails 161, 163, 165 may extend in a longitudinal direction along the first axis 103 and may extend continuously from the first longitudinal end 121 to the second longitudinal end 123. The first support rail 161 may be substantially aligned along the second axis 105 with the first internal wall 24. The second support rail 163 may be substantially aligned along the second axis 105 with the second internal wall 26 and may increase stiffness and strength of the sill 112. The third support rail 165 may be substantially aligned along the second axis 105 with the third internal wall 28 and may increase stiffness and strength of the sill 112.

Moreover, the slider rail 202 may be substantially aligned along the second axis 105 with the first internal wall 24 and the first support rail 161. Thus, there may be an aligned vertical path for weight and other loads from the first panel 106 to distribute from the slider rail 202, through the first internal wall 24, and to the first support rail 161. Accordingly, the sill 112 may provide robust support for the first panel 106, for example, as the first panel 106 slides along the slider rail 202.

The sill 112 may be tilted downward slightly from the interior side 88 to the exterior side 90. In some embodiments, the first support rail 161 may be taller than the second support rail 163, and the second support rail 163 may be taller than the first support rail 165 to pitch and tilt the outer wall 69 toward the exterior.

As shown in FIG. 2, the outer wall 69, the internal walls 24, 26, 28, the lips 71, 73, 75, the first support rail 161, the second support rail 163, and the third support rail 165 may each terminate at the first longitudinal end 121 so as to lie substantially within the plane 39. This plane 39 may be substantially normal to the first axis 103. The first longitudinal end 121 may face the corner key 118 and, thus, may be referred to as a "corner key facing end." The second longitudinal end 123 may be similar to the first longitudinal end 121 and may face the corner key 118 at the opposite corner of the frame 104.

The corner keys 118 of the sill arrangement 110 will now be discussed, initially with reference to FIGS. 2 and 4. Attachment of the corner keys 118 to the ends 121, 123 of the sill 112 will also be discussed with reference to FIGS. 3 and 5. The corner keys 118 may cap off and cover the open longitudinal ends of the sill 112. The corner keys 118 may be manufactured as a single, integral structure and may be made of any suitable material, such as an injection molded plastic material. Although only one of the corner keys 118 of the sill arrangement 110 is shown in detail in FIGS. 2-5, the other corner key 118 may be substantially similar and a mirror-image of the illustrated embodiment.

The corner key 118 may be block-like and may be thinner along the first axis 103 as compared to a width of the corner key 118 along the third axis 107. The corner key 118 may generally include a sill-facing surface 44 (FIG. 4) that faces along the first axis 103 and that is attached to the first longitudinal end 121 of the sill 112. The corner key 118 may further include a jamb-facing surface 45 that faces upward along the second axis 105 and that is attached to the first jamb 113 (FIG. 1).

As shown in FIG. 4, the corner key 118 may include a base 47 defining a lower portion that corresponds and mates to the sill 112 as will be discussed. The corner key 118 may further include a jamb portion 49 that is thinner and that extends along the second axis 105 from the base 47 for mating to the jamb 113. The jamb portion 49 may include a divider ridge 63 on the sill-facing surface 44 thereof.

As shown in FIG. 4, the corner key 118 may further include a first port 52 and a second port 50. The first port 52 and the second port 50 may be polygonal (e.g., substantially rectangular) recesses that are recessed along the axis 103 into the base 47 of the corner key 118. The ports 50, 52 may be offset from one another along the third axis 107. The first port 52 may be disposed closer to the interior side 88 than the exterior side 90 along the axis 107, and the second port 50 may be disposed closer to the exterior side 90 than the interior side 88. In some embodiments, the ports 50, 52 may be at least partly aligned along a straight line that extends substantially along the third axis 107. The line aligning the ports 50, 52 may be disposed at a slight angle relative to the axis 107.

The corner key 118 may further include a drain 65 (FIG. 4). The drain 65 may be a polygonal (e.g., substantially rectangular) recess that is recessed in the sill-facing surface 44, and the drain 65 may be disposed at the exterior side 90 of the arrangement 110. The drain 65 may be aligned along the same substantially horizontal line with the first and second ports 50, 52.

Also, as shown in FIG. 4, the corner key 118 may include a degassing arm 66 extending outwardly from the sill-facing surface 44. The degassing arm 66 may be formed as an integral component of the corner key 118. The degassing arm 66 may be generally L-shaped, with a horizontal flange 68 and a vertical flange 70 arranged generally orthogonally to one another. The horizontal flange 68 of the degassing arm 66 may extend across the first port 52 of the corner key 118 along the third axis 107. The vertical flange 70 may wrap over the first port 52 proximate the interior side 88. Furthermore, the degassing arm 66 may include a notch 87 that separates a first portion of the horizontal flange 68 from a second portion of the horizontal flange 68.

The sill-facing surface 44 may further include a plurality of mount extensions 37, 40, 42. The mount extensions 37, 40, 42 may be projections of the sill-facing surface 44 that extend along the first axis 103 from the base 47. The mount extensions 37, 40, 42 may be formed as integral components of the corner key 118.

As mentioned above and as illustrated in FIGS. 3, 5, and 6, the sill 112 and the corner key 118 may be fixedly attached together to define the sill arrangement 110.

When the corner key 118 is coupled to the sill 112, the mount extensions 37, 40, 42 may sit against and engage various regions of the sill 112 to help support and stabilize the corner key 118 in position against the sill 112. For example, the mount extension 37 and the mount extension 40 may be received in the first chamber 32 of the sill 112, proximate the interior side 88. Similarly, the mount extension 42 may be received in the fourth chamber 38 of the sill 112, proximate the exterior side 90 of the sill arrangement 110.

Also, a plurality of separate fasteners (screws, etc.) may fixedly attach the corner key 118 to the sill 112 at various attachment points. In some embodiments, the sill 112 may include fastener receiving notches 125 that are aligned with fastener holes 127 of the corner key 118, and screws may be received in respective pairs of notches 125 and holes 127 to fix the corner key 118 to the sill 112.

The jamb 113 may be fixedly attached to the jamb portion 49 of the corner key 118 in a number of ways. For example, as shown in FIG. 2, additional fastener holes 128 may be included for receiving screws or other fasteners for attaching the corner key 118 to the jamb 113.

In addition, adhesives may be used in the attachment of the sill 112 and corner key 118 and/or in the attachment of the jamb 113 and the corner key 118. In some embodiments, gaskets and/or sealant may be included for sealing gaps in the sill arrangement 110 and/or between the jamb 113 and corner key 118.

When attached, the first longitudinal end 121 of the sill 112 may abut against the sill-facing surface 44 of the corner key 118 at the base 47. The first internal wall 24 may be received in the notch 87 with one portion of the flange 68 received in the first chamber 32 and another portion of the flange 68 received in the second chamber 34. In this attached position, the first port 52 may extend across a first wall end 130 of the first internal wall 24 at the first longitudinal end 121 of the sill 112 to fluidly connect the first chamber 32 and the second chamber 34. In other words, the first wall end 130 and the first port 52 may define a first fluid passageway 132 between the first chamber 32 and the second chamber 34. Also, the horizontal flange 68 of the degassing arm 66 may abut against the second internal wall 26 of the sill 112 to block off and/or seal a gap therebetween. Also, the vertical flange 70 of the degassing arm 66 may block off areas of the port 52 proximate the interior side 88. The first fluid passageway 132 may be sufficiently small to minimize water or air intrusion from flowing back into the chamber 32.

Additionally, when attached, the first port 52 may extend across a second wall end 134 of the second internal wall 26 at the first longitudinal end 121 of the sill 112 to fluidly connect the second chamber 34 and the third chamber 36. In other words, the second wall end 134 and the first port 52 may define a second fluid passageway 136 between the second chamber 34 and the third chamber 36.

Moreover, the second port 50 may extend across a third wall end 138 of the third internal wall 28 at the first longitudinal end 121 of the sill 112 to fluidly connect the third chamber 36 and the fourth chamber 38. In other words, the third wall end 138 and the second port 50 may define a third fluid passageway 139 between the third chamber 36 and the fourth chamber 38.

Figure 6:
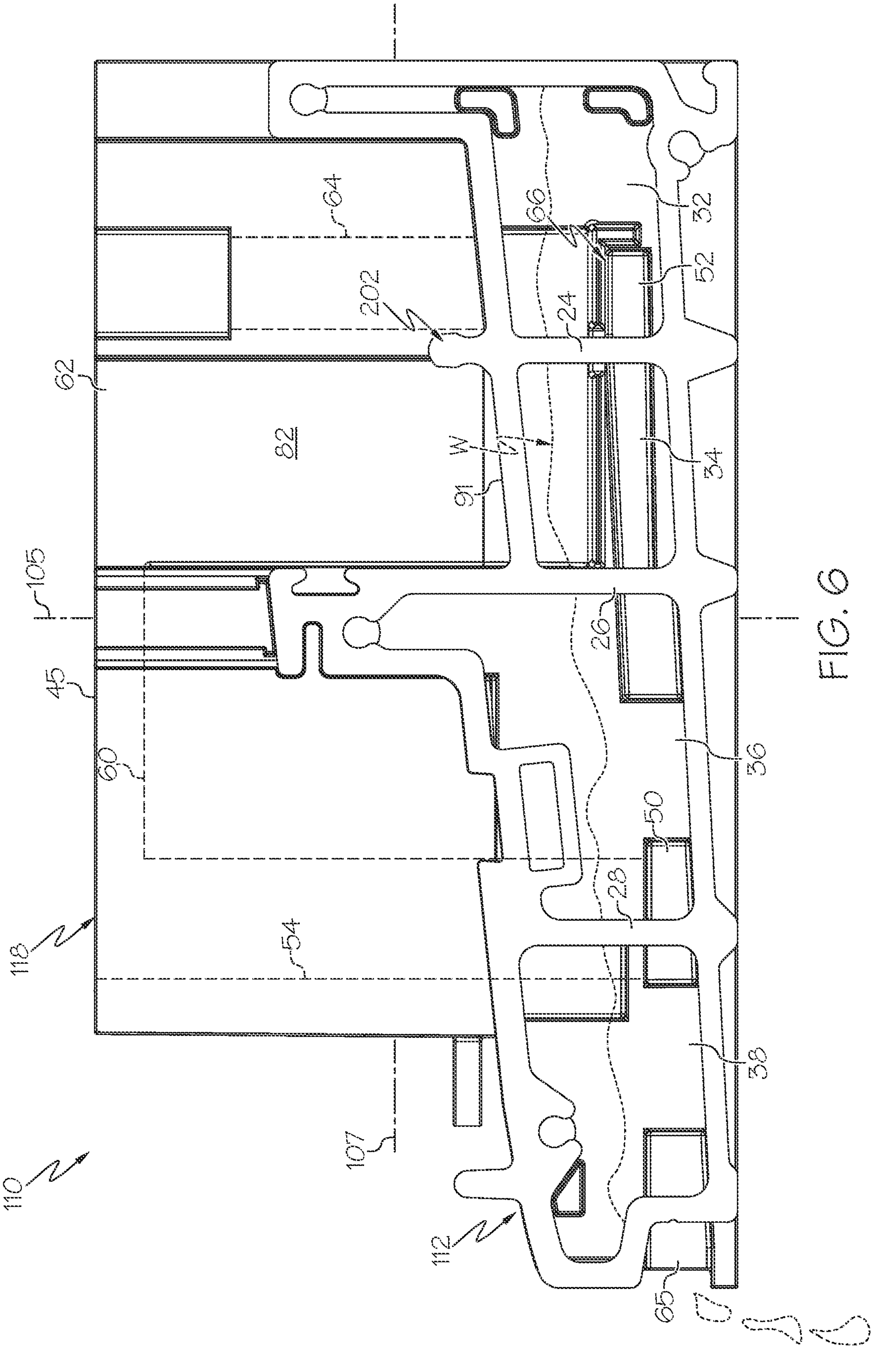
FIG. 6 is a side view of the sill arrangement of FIGS. 2-5.

As shown in FIGS. 3, 4, and 6, the corner key 118 may further include a chimney vent 54 (shown partially in phantom). The chimney vent 54 may be a tube extending along the second axis 105 through an interior region of the corner key 118. The chimney vent 54 may have a first open end 155 on the jamb-facing surface 45. The chimney vent 54 may extend from the open end 155 along the second axis 105 to fluidly connect to the second port 50 as shown in FIGS. 4 and 6. The chimney vent 54 may extend to a sufficient height above the second port 50 to help produce a desired pressure gradient reduction in the chambers 36, 38 and to collect any water droplets carried by the air moving within the arrangement 110. In some embodiments, the chimney vent 54 may extend to a height of at least approximately 0.25 inches above the second port 50. In other embodiments, the chimney vent 54 may range in height between approximately 0.25 inches and approximately 5 inches.

The upper jamb-facing surface 45 of the corner key 118 may further include an air channel 60 formed thereon (FIGS. 2 and 3). The air channel 60 may extend along the upper jamb-facing surface 58 and may be fluidly connected at one end to the open end 155 of the chimney vent 54. The air channel 60 may extend primarily along the third axis 107 but non-linearly along the upper jamb-facing surface 58 from the open end 155 of the chimney vent 54 toward the interior side 88 of the arrangement 110.

The corner key 118 may further include an opening 82 on the sill-facing surface 44. The opening 82 may be a block-shaped or columnar recess included on the jamb portion 49 of the corner key 118. The opening 82 may be disposed proximate the divider ridge 63. The corner key 118 may further include a passageway 62 that fluidly connects the channel 60 to the opening 82. The opening 82 may be fluidly connected at its lower end to the first port 52. Thus, when the corner key 118 is mated with the sill 112, the opening 82 opens into the second chamber 34 of the sill 112 (see FIG. 5).

The corner key 118 may additionally include a rear vent 64. The rear vent 64 may be a tubular passage that extends through the jamb portion 49 of the corner key 118, proximate the interior side 88 of the arrangement 110. The rear vent 64 may extend along the second axis 105. The rear vent 64 may include a bottom opening 81 that is open to the first port 52, and the rear vent 64 may include a top opening 83 that is open at the jamb-facing surface 45.

As shown in FIG. 4, the corner key 118 may further include a bridge 92. The bridge 92 may extend across the opening 82 along the third axis 107 and may be suspended at both ends between the rear vent 64 and the divider ridge 63. The bridge 92 may be offset from the jamb portion 49 of the corner key 118. Accordingly, the bridge 92, the divider ridge 63, the rear vent 64, and the jamb portion 49 may cooperate to define an aperture 91 that fluidly connects the opening 82 to the first port 52.

The chimney vent 54, air channel 60, passageway 62, opening 82, the aperture 91, and the rear vent 64 may be fluidly connected and arranged in-series in this order in a fluid stream direction (i.e., an upstream direction or a downstream direction). The chimney vent 54, air channel 60, passageway 62, opening 82, aperture 91, and rear vent 64 may be arranged to provide a continuous fluid pathway. This fluid pathway may be configured to reduce the pressure gradient in the third and fourth chambers 36, 38, thereby allowing water to exit the chambers 36, 38 and ultimately exit the sill arrangement 110. The components also work together to create a circuitous path with various walls and boundary surfaces designed to help collect any water droplets from the air flowing through the corner key 118 and sill 112 to minimize water infiltration into the dwelling.

Fluid flow through the sill arrangement 110 will now be discussed with reference to FIG. 6. These features may substantially prevent water (identified "W" in FIG. 6) from entering into the building or dwelling. The sill arrangement 110 may function as a self-draining system for an exterior door of a building or dwelling.

Generally, the water management system of the sill arrangement 110 is designed to store a column of water in the first and/or second chambers 32, 34 where the water builds static head pressure as it accumulates. The water management system then uses this static head pressure built by the column of water to overcome the pressure differential across the sill arrangement 110 and drive water out of the arrangement 110. Depending on the amount of static head pressure built in the chambers 32, 34 some water may be driven out of the arrangement 110 even as water continues flowing in.

More specifically, as shown in FIG. 6, when minimal water enters the sill 112, gravity allows the sill 112 to self-drain and direct water toward the exterior side 90 due to the overall slanted profile of the sill 112 outwardly to the exterior environment and away from the interior portion of the building. More specifically, if water intrudes toward the interior side 88 of the sill 112, the water may accumulate in the first chamber 32. Under normal conditions (e.g., no substantive differential pressure between the interior and exterior portions of the sill arrangement 110), the accumulated water may be directed toward the first port 52 of the corner key 118, whereat the water travels around the first internal wall 24 at the first longitudinal end 121 and through the first port 52 to the second chamber 34. From the second chamber 34, the water may move toward the second internal wall 26 at the first longitudinal end 121 and through the first port 52 to the third chamber 36. From the third chamber 36, the water may move toward the third internal wall 28 at the first longitudinal end 121 and through the second port 50 to the fourth chamber 38. Thereafter, the water may exit from the fourth chamber 38 via the drain 65.

In some situations, an air pressure differential across the arrangement 110 may occur, with higher air pressure exerted on the exterior of the building than on the interior of the building. This pressure differential may cause water to move from the exterior toward the interior of the building. This water movement may continue until the pressure is equalized between the interior and exterior of the building. During these pressure conditions water may accumulate within the sill 112.

For example, the incoming water may accumulate in the first chamber 32 and the second chamber 34. Over time, the water level in the chambers 32, 34 may rise as water continues moving into the sill 112 due to wind and increasing pressure differentials. As the water column rises in the chambers 32, 34, it may build a head pressure that serves to counter the high-pressure areas building in the third and fourth chambers 36, 38. The chimney vent 54 may serve to temper the high-pressure gradient between the chambers 34, 36 by directing fluid flow upwardly from the second port 50 and into the upper jamb-facing surface 45 of the corner key 118, whereat water may flow through the channel 60, the passageway 62, the opening 82, and the aperture 91. The rear vent 64 may relieve bubbling or percolation in the chamber 32 and prevent water from further intrusion. The sill arrangement 110 may also fluidly connect the higher-pressure regions of the sill 112 (e.g., the exterior of the dwelling) to lower-pressure regions (e.g., the interior of the dwelling), thereby allowing the pressure differential within the sill 112 to quickly stabilize.

If air flows through the pathway, droplets of water therein may be trapped and collected either by the walls of the chimney vent 54 or the walls of the channel 60 (or other sections of the pathway), thereby minimizing droplet infiltration into the interior of the dwelling. To further minimize droplet infiltration, air or water being forced toward the interior of the dwelling (i.e., upstream) through the ports 50, 52 may be initially obstructed by the degassing arm 66 to provide additional time for outgassing of the water/air mixture being driven in an upstream direction through the sill 112.

It will be appreciated that the respective height dimensions of the first and second chambers 32, 34 (measured along the second axis 105) may contribute to the overall performance of the sill arrangement 110, as the heights determine how much head pressure may be accumulated in the sill 112. Accordingly, the heights of the first and second chambers 32, 34 may be selected to allow for water build-up and head pressure to overcome air pressure differentials in a given region. In some embodiments, local weather data may be used to determine anticipated air pressure differentials to calculate an appropriate height for the first and second chambers 32, 34 to ensure that the water will build sufficient head pressure to avoid water intrusion into the interior of the building or dwelling.

Also, the respective width, height, and depth dimensions of the ports 50, 52 may be selected to provide a sufficiently large pathway for promoting adequate flow of water through the ports 50, 52 and allowing water to exit the sill arrangement 110. The first port 52 may have a larger passageway (e.g., a passageway with a larger cross-sectional area) as compared to that of the second port 50.

As described previously, the degassing arm 66 serves to block or impede much of the water and air moving upstream toward the interior of the dwelling from the third chamber 36 toward the second chamber 34 and first chamber 32 through the first port 52, while accommodating the flow of the water downstream toward the exterior of the dwelling from the second chamber 34 when possible. While some water and air may bypass the degassing arm 66 and flow into the first and/or second chambers 32, 34, the degassing arm 66 may define a tortuous path by increasing the distance and time that the incoming water/air mixture must travel as it exits the first port 52 before it can infiltrate the interior of the dwelling. Diverting the water and air also provides additional time for outgassing the water/air mixture while it is contained within the sill 112 and corner key 118. This outgassing process may help prevent or minimize infiltration of water droplets through the sill 112 and into the interior of the building or dwelling.

The length of the degassing arm 66 (i.e., the distance that the arm 66 projects along the first axis 103 from the surrounding areas of the corner key 118) may be chosen based on the features and characteristics of the corner key 118. Generally, the length of the degassing arm 66 may be greater than the height of the shorter of the two ports 50, 52 (as measured from their respective bottom surfaces to their top surfaces).

Thus, the water management system provided in the sill arrangement 110 is effective and efficient and provides a number of benefits. The water management system of the sill arrangement 110 is incorporated using relatively simple features. The water management system may be constructed and assembled in a short amount of time, and the part count is relatively low. Complex weep designs integrated into the sill or stepped joinery at the jamb-sill intersection of the fenestration structure are unnecessary. Accordingly, this versatility allows for easier installation and simplifies jamb and sill-end work.

Moreover, it will be appreciated that the sill arrangement 110 is highly robust even with the water management system incorporated therein. For example, the sill arrangement 110 may firmly support the first panel 110 as it slides open and closed. Thus, the sill arrangement 100 may be useful for a slider door or slider window fenestration unit.

It is intended that subject matter disclosed in particular portions herein can be combined with the subject matter of one or more of other portions herein as long as such combinations are not mutually exclusive or inoperable. In addition, many variations, enhancements and modifications are possible.

The terms and descriptions used above are set forth by way of illustration only and are not meant as limitations. Those skilled in the art will recognize that many variations can be made to the details of the above-described embodiments without departing from the underlying principles of the present disclosure.

The invention claimed is:

1. A sill arrangement for a fenestration frame configured for supporting a panel, the sill arrangement comprising:

a sill that is elongate and that includes a first longitudinal end and a second longitudinal end, the sill including a first chamber, a second chamber, a third chamber, and a fourth chamber, the sill including a first internal wall that separates the first chamber from the second chamber; and a corner key having a sill-facing surface, the corner key coupled to the first longitudinal end of the sill along the sill-facing surface, the corner key comprising:

a first port included on the sill-facing surface, the first port defining a first fluid passage between the first and second chambers of the sill, the first port defining a second fluid passage between the second and third chambers of the sill;

a second port included on the sill-facing surface and offset from the first port, the second port defining a third fluid passage between the third and fourth chambers; and a drain in fluid communication with the fourth chamber and configured to direct fluid from the fourth chamber and out of the corner key.

2. The sill arrangement of claim 1, wherein the panel is a slider panel;

wherein the sill includes a slider rail configured to support the slider panel for sliding movement on the slider rail within the frame.

3. The sill arrangement of claim 2, wherein the slider rail is aligned with the first internal wall.

4. The sill arrangement of claim 3, wherein the sill includes a top side configured to face the panel and a bottom side configured to face away from the panel, the bottom side including a support rail projecting therefrom, the support rail being aligned with the slider rail and the first internal wall.

5. The sill arrangement of claim 1, the corner key further including a chimney vent in communication with the second port.

6. The sill arrangement of claim 5, the corner key further including a jamb-facing surface, the chimney vent extending from the second port and open at the jamb-facing surface.

7. The sill arrangement of claim 6, the corner key further including a channel on the jamb-facing surface, the channel being in fluid communication with the chimney vent; and the corner key further including an opening that is fluidly connected to the channel, the opening being fluidly connected to the first port.

8. The sill arrangement of claim 7, the corner key further including a vent that is fluidly connected to the first port, the vent being open at the jamb-facing surface.

9. The sill arrangement of claim 1, wherein the sill includes a second internal wall separating the second chamber from the third chamber, wherein the first port extends across a first wall end of the first internal wall to fluidly connect the first chamber and the second chamber, and wherein the first port extends across a second wall end of the second internal wall to fluidly connect the second chamber and the third chamber.

10. The sill arrangement of claim 9, wherein the sill includes a third internal wall separating the third chamber from the fourth chamber, and wherein the second port extends across a third wall end of the third internal wall to fluidly connect the third chamber and the fourth chamber.

11. The sill arrangement of claim 1, the corner key further comprising a degassing arm that is proximate the first port and that projects from the sill-facing surface and into the first chamber.

12. The sill arrangement of claim 11, wherein the degassing arm includes a notch that separates a first portion of the degassing arm from a second portion of the degassing arm, the notch receiving the first internal wall, the first portion received in the first chamber, the second portion received in the second chamber.

13. The sill arrangement of claim 12, wherein the first portion includes a first flange and a second flange that is substantially orthogonal to the first flange.

14. The sill arrangement of claim 1, wherein the corner key further includes a plurality of mount extensions that project from the sill-facing surface and that are received in the sill.

15. A fenestration unit comprising:

a first panel;

a second panel; and a frame that supports the first panel and the second panel, the frame including a sill arrangement that comprises:

a sill that is elongate and that includes a first longitudinal end and a second longitudinal end, the sill including a first chamber, a second chamber, a third chamber, and a fourth chamber, the sill including a first internal wall that separates the first chamber from the second chamber, the sill including a slider rail configured to support the first panel for sliding movement on the slider rail within the frame, the slider rail being aligned with the first internal wall; and a corner key having a sill-facing surface, the corner key coupled to the first longitudinal end of the sill along the sill-facing surface, the corner key comprising:

a first port included on the sill-facing surface, the first port defining a first fluid passage between the first and second chambers of the sill, the first port defining a second fluid passage between the second and third chambers of the sill;

a second port included on the sill-facing surface and offset from the first port, the second port defining a third fluid passage between the third and fourth chambers; and a drain in fluid communication with the fourth chamber and configured to direct fluid from the fourth chamber and out of the corner key.

16. The fenestration unit of claim 15, wherein the sill includes a top side configured to face the panel and a bottom side configured to face away from the panel, the bottom side including a support rail projecting therefrom, the support rail being aligned with the slider rail and the first internal wall.

17. The fenestration unit of claim 15, wherein the sill includes a top side that faces the first panel and the second panel; and wherein the top side includes a divider lip that projects therefrom, the divider lip configured to extend between the first panel and the second panel.

18. The fenestration unit of claim 15, wherein the sill includes an interior side and an exterior side; and wherein the first chamber is proximate the interior side and the fourth chamber is proximate the exterior side.

19. The fenestration unit of claim 15, the corner key further comprising a degassing arm that is proximate the first port and that projects from the sill-facing surface and into the first and into the second chamber.

20. A method of assembling a sill arrangement for a fenestration frame configured for supporting a panel, the method comprising:

providing a sill that is elongate and that includes a first longitudinal end and a second longitudinal end, the sill including a first chamber, a second chamber, a third chamber, and a fourth chamber, the sill including a first internal wall that separates the first chamber from the second chamber; and attaching sill-facing surface of a corner key to the first longitudinal end of the sill, the corner key comprising:

a first port included on the sill-facing surface, the first port defining a first fluid passage between the first and second chambers of the sill, the first port defining a second fluid passage between the second and third chambers of the sill;

a second port included on the sill-facing surface and offset from the first port, the second port defining a third fluid passage between the third and fourth chambers; and a drain in communication with the fourth chamber and configured to direct fluid from the fourth chamber and out of the corner key.

* * * * *